United States Patent [19]

Nitta

[11] Patent Number: 4,559,554

[45] Date of Patent: Dec. 17, 1985

[54] COLOR TELEVISION CAMERA WITH A SINGLE IMAGE PICKUP TUBE FEATURING IMPROVED RENDITION OF BRIGHT MONOCHROMATIC OBJECTS

[75] Inventor: Yoshiro Nitta, Kanagawa, Japan

[73] Assignee: Sony Corporation, Tokyo, Japan

[21] Appl. No.: 534,507

[22] Filed: Sep. 21, 1983

[30] Foreign Application Priority Data

Sep. 22, 1982 [JP] Japan .................................. 57-165885

[51] Int. Cl.$^4$ .......................... H04N 9/07; H04N 5/14
[52] U.S. Cl. ......................................... 358/44; 358/37; 358/39
[58] Field of Search ....................... 358/41, 43, 44, 29, 358/37, 39, 40

[56] References Cited

U.S. PATENT DOCUMENTS

| 2,773,116 | 12/1956 | Chatten | 358/39 |
| 2,923,767 | 2/1960 | Altes | 358/39 |
| 3,688,020 | 8/1972 | Kubota | 358/46 |
| 4,236,176 | 11/1980 | Nagumo | 358/43 |

FOREIGN PATENT DOCUMENTS

| 154893 | 12/1980 | Japan | 358/37 |
| 154894 | 12/1980 | Japan | 358/37 |

OTHER PUBLICATIONS

Fink, Donald G. et al., *Electronic Engineers' Handbook*, Second Edition, McGraw-Hill, New York, 1982, Chapter 17, p. 38.

Primary Examiner—Michael A. Masinick
Assistant Examiner—Randall S. Svihla
Attorney, Agent, or Firm—Lewis H. Eslinger; Alvin Sinderbrand

[57] ABSTRACT

In a color television camera of the type having a single image pickup tube with red, green and blue stripe filters for providing an electrical signal indicative of the image of an object, a luminance signal is separated by a low pass filter from the electrical signal, and a chrominance signal is also separated therefrom. A color difference signal is derived from the chrominance signal and is mixed with the luminance signal such that the polarity of the color difference signal is inverted relative to the luminance signal and a magnitude of the color difference signal is adjusted by a predetermined amount. The corrected luminance signal and a carrier chrominance signal are then combined to form a composite color video signal. A noise eliminating circuit is provided for improving the signal to noise ratio of the color difference signal used to correct the luminance signal.

6 Claims, 5 Drawing Figures

COLOR TELEVISION CAMERA WITH A SINGLE IMAGE PICKUP TUBE FEATURING IMPROVED RENDITION OF BRIGHT MONOCHROMATIC OBJECTS

BACKGROUND OF THE INVENTION

1. Field of the invention:

This invention relates to a color television camera having one image pickup tube, and more particularly to a color television camera for generating color video signals with improved color reproducibility characteristics.

2. Description of the Prior Art:

One type of color television camera has three image pickup tubes for three primary colors. In this type of color television camera, light from an object to be televised is directed to an optical color separating system through a common camera lens, and the three color-separated images are focused onto the pickup tubes, respectively. FIG. 1 of the accompanying drawings shows in block form a typical entire arrangement of such a color television camera. The color television camera includes pickup tubes 1R, 1G and 1B onto which color-separated images are focused. The pickup tubes 1R, 1G and 1B then generate electric signals representative of the color components of the images. The output signals from the pickup tubes 1R, 1G and 1B are supplied through preamplifiers 2R, 2G and 2B and processing circuits 3R, 3G and 3B, respectively, to a matrix circuit 4. The matrix circuit 4 generates a luminance signal Y, a red color difference signal R−Y, and a blue color difference signal B−Y from the three primary color signals. The output signals from the matrix circuit 4 are supplied to a color encoder 5 which produces at an output terminal 6 a composite color television signal of the NTSC standard, for example. In the processing circuit 3R, 3G or 3B, each primary color signal is gamma-corrected and the excessive white level is clipped. According to this type of color television camera, when a bright red object is viewed by the camera, the level of the output signal from the pickup tube 1R is high. However, since this signal is supplied to the matrix circuit 4 after it has been gamma-corrected and clipped in its white level in the processing circuit 3R, the luminance signal Y and the red color difference signal have the proper levels, that is, the level of the luminance signal Y from the matrix circuit 4 is about 30% of the maximum luminance signal. With this prior art color television camera, however, the total cost is very high as three pickup tubes and an optical color separating system are required.

Color television cameras are also known which have a single pickup tube having red, green and blue stripe filters arranged at a predetermined pitch on a photoconductive layer of the tube. One such color television camera is shown in U.S. Pat. No. 3,688,020 assigned to the same assignee as the present invention. This type of color television camera requires only one tube with filter means, and hence is much less expensive than the earlier types of color television cameras. However, the single-tube color television camera is disadvantageous in that its color reproduction characteristics are not so good as those of the three-tube color television cameras. This is because the luminance signal, which is output from a low-pass filter, has a high level when the image of a bright red object is picked up, and the color components of the image are derived in the form of frequency-modulated signals or phase-modulated signals. Therefore, the level of the red color difference signal, even if it has been made proper, is still low relative to the luminance signal level. This shortcoming causes an image reproduced on the signals from the single-tube type camera to be deteriorated such that the red color is faded and its saturation appears to be decreased as compared with the actual color.

SUMMARY OF THE INVENTION

Accordingly, it is an object of the present invention to provide a single-pickup-tube color television camera having means for preventing color reproducibility characteristics from being degraded when the luminance signal has a high level.

Another object of the present invention is to provide a single-pickup-tube color television camera having means for preventing the S/N ratio of the luminance signal from becoming poor to thereby improve color reproduction characteristics.

According to the present invention, a color television camera having a single image pickup tube has good color reproduction capabilities. The image pickup tube includes color separation filter means on a photoelectric conversion surface thereof. A luminance signal is separated by a first means from an electric signal indicative of the image of an object to be televised, and a chrominance signal is separated by a second means from the same electric signal. At least a red color difference signal (R−Y) is mixed by a mixer with the luminance signal at a predetermined ratio with a polarity with which the red color difference signal is subtracted from the luminance signal. The output from the mixer and a plurality of color difference signals are supplied to a color encoder which then issues a composite color video signal.

The above and other objects, features and advantages of the present invention will become more apparent from the following detailed description, and the novel features of the invention will be particularly pointed out in the appended claims.

BRIEF DESCRIPTION OF THE DRAWINGS

The following detailed description, given by way of example and not intended to limit the present invention solely to the described embodiments, will best be understood in conjunction with the accompanying drawings in which.

DETAILED DESCRIPTION OF THE PREFERRED EMBODIMENTS

Figure 1:
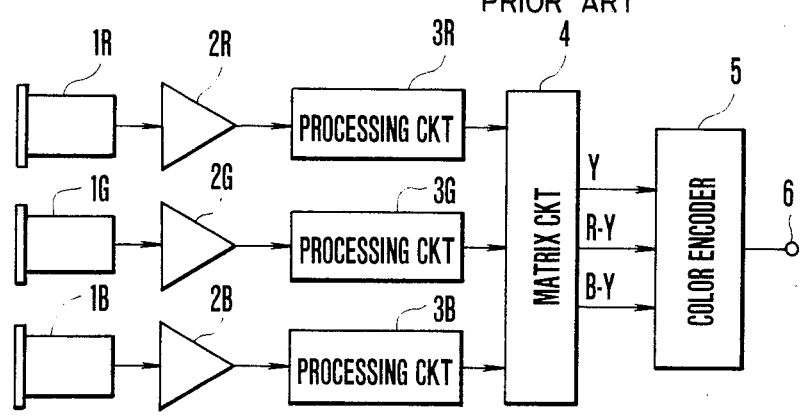
FIG. 1 is a block diagram of a conventional color television camera having three image pickup tubes.
Figure 2:
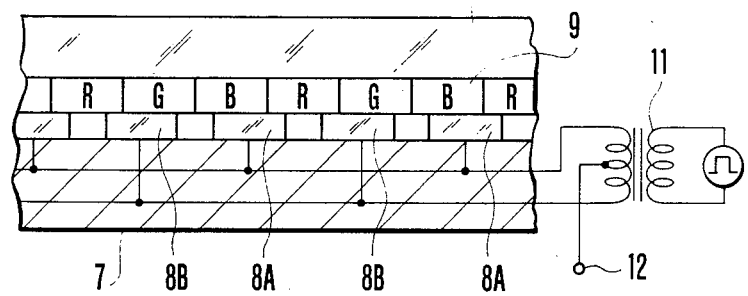
FIG. 2 is an enlarged fragmentary cross-sectional view of a construction of a color image pickup tube according to an embodiment of the present invention.

FIG. 2 shows on an enlarged scale an optical color separating system of a color image pickup tube according to an embodiment of the present invention.

The optical color separating system is composed of a target 7, index electrodes 8A, 8B in the form of stripes of transparent electrically conductive film deposited on the target 7, color separation stripe filters 9 deposited on the index electrodes 8A, 8B, and a face plate 10 disposed on the stripe filters 9.

The stripe filters 9 are in the form of a repetitive pattern of filters R, G and B of three primary colors (red, green and blue), One set of three strip filters 9 is associated with a pair of index electrodes 8A, 8B. To the index electrodes 8A, 8B, there is applied a DC voltage necessary for energizing the target 7 and supplied offset pulses with their levels varying in each horizontal period (1H). The offset pulses which are of opposite polarities are applied to the respective index electrodes 8A, 8B from opposite terminals of a transformer 11 having a central tap from which extends an output terminal 12 of the color image pickup tube.

Figure 3:
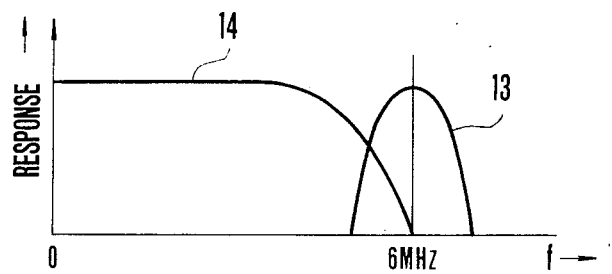
FIG. 3 is a frequency spectrum diagram of an output of the color pickup tube of the present invention.

The output signal produced by the color image pickup tube has frequency spectra as illustrated in FIG. 3. As an example, an index signal generated by the index electrodes 8A, 8B, in the output signal from the color image pickup tube has a frequency of 6 MHz, and the index signal and chrominance signal have a frequency spectrum as indicated by the curve 13 in FIG. 3. The luminance signal with its frequency band limited by an optical low-pass filter has a frequency spectrum as indicated by the curve 14.

Figure 4:
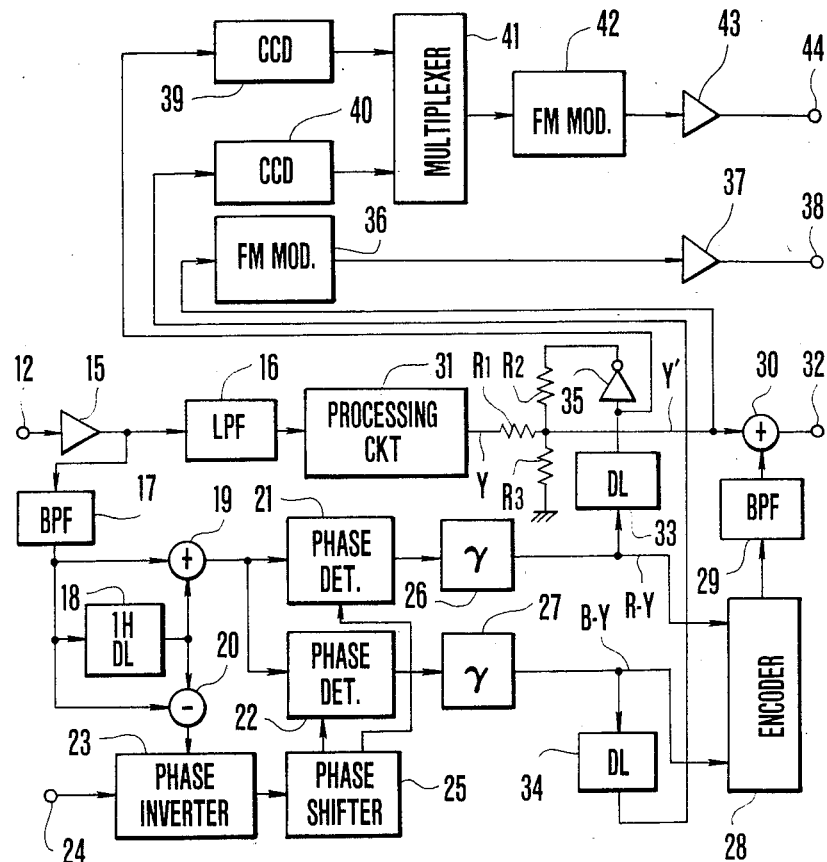
FIG. 4 is a block diagram of a color television camera according to the present invention.

In FIG. 4, the output signal from the color image pickup tube of the invention is supplied through a pre-amplifier 15 to a low-pass filter 16 and a bandpass filter 17. The low-pass filter 16 serves to separate a luminance signal from the output signal of the color image pickup tube, and the bandpass filter 17 serves to separate a chrominance signal and an index signal from the output signal of the color image pickup tube. The output signal from the bandpass filter 17 is fed to a 1H delay circuit 18, an adder 19, and a subtractor 20. Since the offset pulses applied to the index electrodes 8A, 8B are inverted in phase in each horizontal period, the adder 19 produces as an output a phase-modulated chrominance signal component only, and the subtractor 20 produces as an output an index signal only.

The chrominance signal from the adder 19 is supplied to phase detectors 21, 22. The index signal from the subtractor 20 is supplied to a phase inverter 23 which is supplied with control pulses from a terminal 24 for phase inversion in each horizontal period to bring the signal into phase in each scanning line. The phase inverter 23 issues an output to a phase shifter 25 that generates a detection carrier signal for each of the phase detectors 21, 22. The phase detectors 21, 22 produce a red color difference signal $R-Y$ and a blue color difference signal $B-Y$, respectively, supplied through gamma correctors 26, 27, respectively, to an encoder 28 in which the color difference signals are subjected to quadrature phase modulation and a burst signal is added thereto. The encoder 28 issues a carrier chrominance signal via a bandpass filter 29 to a mixer 30.

The luminance signal as separated by the low-pass filter 16 is supplied to a processing circuit 31 in which the signal is clamped and gamma-corrected and a synchronous signal is added thereto. The processing circuit 31 issues a luminance signal Y which is corrected in a manner described later on, and a corrected luminance signal Y' is supplied to the mixer 30. The mixer 30 now produces on its output terminal 32 an NTSC composite color video signal.

The color difference signals $R-Y$, $B-Y$ issued from the gamma correctors 26, 27 are picked up as VTR recording signals through delay circuits 33, 34, respectively. The luminance signal and the carrier chrominance signal are brought into matching phase with each other in order to be mixed by the mixer 30, and thus the color difference signals at the output terminals of the gamma correctors 26, 27 are advanced, for example 100 nsec., in phase with respect to the phase of the luminance signal. The delay circuits 33, 34 are provided to compensate for such a phase advance.

The red color difference signal $R-Y$ from the delay circuit 33 is inverted in phase by an inverter 35, and the inverted signal is then mixed with the luminance signal Y by a mixer composed of resistors R1, R2, R3 (R3>>R1, R3>>R2). Where the effect of gamma correction is neglected for the sake of brevity, the mixer produces the corrected luminance signal Y' which can be expressed as follows:

$$Y'=Y+\{-k(R-Y)\}$$

Thus, the color difference signal $R-Y$ is mixed with the luminance signal Y in such a manner that its polarity is inverted, i.e., it is subtracted from luminance signal Y, and furthermore its magnitude is multiplied by a predetermined value k, where k is determined by the values of resistors R1, R2, R3. The signal $k(R-Y)$ may be considered a level adjusted $R-Y$ signal, adjusted in accordance with the predetermined ratio k of the values of the resistors.

Since $Y=0.11B+0.30R+0.59G$ and $$R-Y=0.70R-0.11B-0.59G,$$

the above equation can be modified into $$Y'=0.11(1+k)B+0.59(1+k)G+(0.30-0.70k)R$$

This equation indicates that when the image of a bright red object is picked up, $B=G=0$, and hence the corrected luminance signal Y' is lower in level than the luminance signal prior to correction.

Where the stripe filters 9 have equal light transmittivities, the luminance signal Y can be expressed by:

$$Y=0.33B+0.33R+0.33G$$

and the corrected luminance signal Y' can be expressed as follows:

$$Y'=0.33(1+k)B+0.33(1+k)G+(0.33-0.67k)G$$

Under this condition, the red signal is corrected so that its level will be further reduced, and the green signal is corrected so as to approach a prescribed coefficient 0.59. The blue signal is corrected so as to differ from a prescribed coefficient 0.11. Since visibility of blue is lower than that of red and green, the influence of such blue signal correction is small. The blue color difference signal $B-Y$ as well as the red color difference signal $R-Y$ may however be used for correcting the luminance signal Y. Such signal correction is capable of allowing the ratio between the colors in the corrected luminance signal Y' to approach a prescribed value.

In the illustrated embodiment, the single-pickup-tube color television camera is combined with a helical scan VTR apparatus which effects the following signal processing:

The corrected luminance signal Y' is frequency-modulated by a frequency modulator 36, which issues an output signal via a recording amplifier 37 to an output terminal 38. The color difference signals R−Y, B−Y from the delay circuits 33, 34 are supplied respectively to timing axis compression circuits 39, 40 each comprising CCD (Charge-Coupled Device) which compress the supplied signals into front and rear halves of a 1H video signal period. The compressed signals are then supplied to a multiplexer 41. The color difference signals as sequentially arranged by the multiplexer 41 are supplied to a frequency modulator 42 which issues an output through a recording amplifier 43 to an output terminal 44. The signals appearing on the output terminals 38, 44 are supplied through a rotary transformer (not shown) to a rotating head with two gaps and recorded along two parallel video tracks on a magnetic tape.

With the foregoing arrangement, luminance and color difference signals prior to being converted into a composite color video signal as an output from a color television camera. This can simplify the construction of the color television camera and prevents recorded signals from being degraded in quality. To effect the above recording, the luminance signal Y and the color difference signals R−Y, B−Y are brought into the same phases with each other and gamma-corrected, so that the color difference signal R−Y and the luminance signal Y can be mixed with ease.

With single-pickup-tube color television camera, the luminance signal Y has a better S/N ratio than those of the color difference signals R−Y, B−Y. Therefore, there is a tendency for the S/N ratio of the luminance signal Y to become poor when it is mixed with the color difference signal R−Y. To cope with this drawback, the output terminal of the inverter 35 may be connected to a circuit for eliminating noise from a non-signal level of the color difference signal R−Y.

Figure 5:
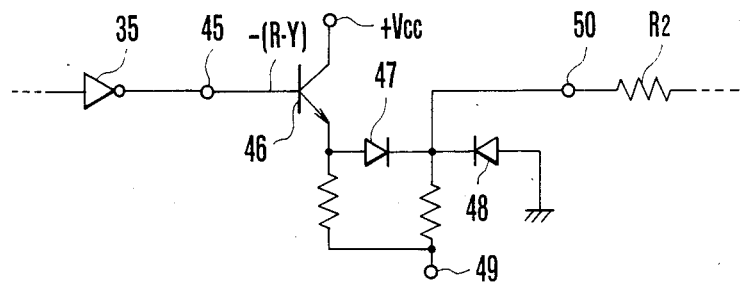
FIG. 5 is a circuit diagram of a portion of a color television camera according to another embodiment of the present invention.

FIG. 5 illustrates such a noise eliminating circuit comprising an input terminal 45 supplied with the color difference signal −(R−Y) from the inverter 35, and an emitter follower transistor 46 having an emitter grounded through diodes 47, 48 with their cathodes connected to each other. The emitter of the transistor 46 and the junction between the cathodes of the diodes 47, 48 are connected to a negative power supply terminal 49. The junction between the diode cathodes is also coupled to an output terminal 50. To the output terminal 50 is connected the mixer (FIG. 4) composed of the resistors R1, R2 and R3.

In operation, when the output from the emitter of the transistor 46 is positive, this positive output signal is picked up through the diode 47 from the output terminal 50. When the emitter output is negative, the diode 47 is turned off and the diode 48 is turned on, bringing the signal level at the output terminal 50 into a substantially ground potential. Accordingly, any input lower than a substantially ground level can be prevented from being transmitted, and hence any noise components can be blocked.

While the color television camera of the electronic index phase separation type has been illustrated, it will be noted that the present invention is applicable to a color television camera of the frequency separation type.

Although certain preferred embodiments have been shown and described, it should be understood that many changes and modifications may be made therein without departing from the scope of the appended claims.

What is claimed is:

1. A color television camera having a single image pickup tube including a photoconductive layer and filter means disposed on said photoconductive layer for forming on said photoconductive layer a color separated image in accordance with the color components of an object to be televised, said color television camera comprising:

means for generating an electric signal corresponding to said image;

first separating means for separating a luminance signal from said electric signal;

second separating means for separating a chrominance signal from said electric signal;

demodulating means for demodulating a plurality of color difference signals from said chrominance signal, including at least a red color difference signal;

mixing means for mixing said luminance signal with at least said red color difference signal, said red color difference signal having a level thereof adjusted by said mixing means by multiplication of said level by a predetermined ratio and having a polarity thereof inverted relative to said luminance signal such that a level adjusted red color difference signal is subtracted from said luminance signal to provide a corrected luminance signal; and encoding means supplied with said plurality of color difference signals and said corrected luminance signal from said mixing means for generating a composite color video signal.

2. A color television camera according to claim 1, wherein said mixing means includes inverting means for inverting the red color difference signal to have said predetermined polarity relative to said luminance signal, and means for combining the luminance signal and an output from said inverting means.

3. A color television camera according to claim 2, wherein said means for combining includes at least two resistors, and said luminance signal and the output from said inverting means are supplied to said resistors such that said output from said inverting means has its level adjusted by said predetermined ratio and said level adjusted output and said luminance signal are added, said predetermined ratio being determined by the ratio of resistances of said resistors.

4. A color television camera according to claim 1, wherein said mixing means includes delay means for delaying the red color difference signal provided thereto to compensate for a delay caused by said encoding means in the red color difference signal supplied thereto.

5. A color television camera according to claim 1, wherein said mixing means includes noise eliminating means supplied with said red color difference signal for eliminating noise in said red color difference signal.

6. A color television camera according to claim 5, wherein said noise eliminating circuit eliminates noise having a level below a reference level.

* * * * *